United States Patent
Solihin

(10) Patent No.: US 9,473,426 B2
(45) Date of Patent: Oct. 18, 2016

(54) HYBRID ROUTERS IN MULTICORE ARCHITECTURES

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

(*) Notice: Subject to any disclaimer, the term of this patent is extended or adjusted under 35 U.S.C. 154(b) by 433 days.

(21) Appl. No.: 14/005,520

(22) PCT Filed: Mar. 20, 2013

(86) PCT No.: PCT/US2013/033115
§ 371 (c)(1),
(2) Date: Sep. 16, 2013

(87) PCT Pub. No.: WO2014/149040
PCT Pub. Date: Sep. 25, 2014

(65) Prior Publication Data
US 2014/0286179 A1    Sep. 25, 2014

(51) Int. Cl.
*H04L 12/66* (2006.01)
*H04L 12/931* (2013.01)
*H04L 12/947* (2013.01)
(Continued)

(52) U.S. Cl.
CPC ............. *H04L 49/60* (2013.01); *H04L 49/251* (2013.01); *H04L 49/252* (2013.01); *H04L 49/101* (2013.01)

(58) Field of Classification Search
CPC ................ H04B 2201/70707; H04B 1/709; H04L 47/32; H04L 12/6418; H04L 45/00; H04Q 11/0005; H04Q 2011/0052

USPC ....... 370/235, 230, 388, 352, 353, 354, 386, 370/387
See application file for complete search history.

(56) References Cited

U.S. PATENT DOCUMENTS

| 8,284,766 B2 | 10/2012 | Anders et al. |
| 2003/0161386 A1* | 8/2003 | Schilling ................. H04B 1/707 375/141 |
| 2004/0001476 A1* | 1/2004 | Islam ....................... G06F 9/546 370/352 |

(Continued)

OTHER PUBLICATIONS

Shekhar, Borkar, Andrew A. Chien,"The Future of Microprocessors",Communications of the ACM, May 2011, p. 67-77, vol. 54.
(Continued)

*Primary Examiner* — Charles C Jiang
*Assistant Examiner* — Will Lin
(74) *Attorney, Agent, or Firm* — Moritt Hock & Hamroff LLP; Steven S. Rubin, Esq.

(57) ABSTRACT

Technologies are generally described for methods and systems effective to implement hybrid routers in multicore architectures. A first tile may include a processor core, a cache configured to be in communication with the processor core and a router configured to be in communication with the cache. The router may be effective to move data with a packet switching channel or a circuit switching channel. The first tile may include switching logic configured to be in communication with the cache and the router. The switching logic may be effective to receive a routing objective that may relate to energy or delay costs in routing data through the network. The switching logic may select one of the packet switching channel or the circuit switching channel to move the data through the network based on the routing objective.

20 Claims, 10 Drawing Sheets

(51) Int. Cl.
*G06F 12/08* (2016.01)
*H04L 12/933* (2013.01)

(56) References Cited

U.S. PATENT DOCUMENTS

| | | | | |
|---|---|---|---|---|
| 2004/0196831 | A1* | 10/2004 | Lu | H04L 12/6418 370/352 |
| 2004/0225771 | A1* | 11/2004 | Riesenman | G06F 13/423 710/200 |
| 2009/0168767 | A1* | 7/2009 | Anders | G06F 15/17375 370/355 |

OTHER PUBLICATIONS

Jerger, N. E., Mikko H. Lipasti, Li-Shivan Peh, "Circuit-Switched Coherence", in 2nd Annual IEEE Network on Chip Symposium, Newcastle-Upon-Tyne, UK, Apr. 2008, 10 pages.

International Search Report for PCT application with application No. PCT/US2013/033115, dated Jun. 26, 2013, 10 pages.

Secchi, S. et al"A Network on Chip Architecture for Heterogeneous Traffic Support with Non-Exclusive Dual-Mode Switching", Proceedings of the 2008 11th EUROMICRO Conference on Digital System Design Architectures, Methods and Tools, IEEE Computer Society Washington, DC, USA, 2008, p. 141-148.

Modarressi, M. et al: "A Hybrid Packet-Circuit Switched on-Chip Network Based on SDM", Proceedings of the Design, Automation & Test in Europe Conference & Exhibition, Apr. 2009, p. 566-569.

Srinath, S. et al., Feedback Directed Prefetching: Improving the Performance and Bandwidth-Efficiency of Hardware Prefetchers, Proceedings of the 2007 IEEE 13th International Symposium on High Performance Computer Architecture, 2007, p. 63-74.

Nesbit, K. J. et al., AC/DC: An Adaptive Data Cache Prefetcher, Proceedings of the 13th International Conference on Parallel Architectures and Compilation Techniques, 2004, p. 135-145.

\* cited by examiner

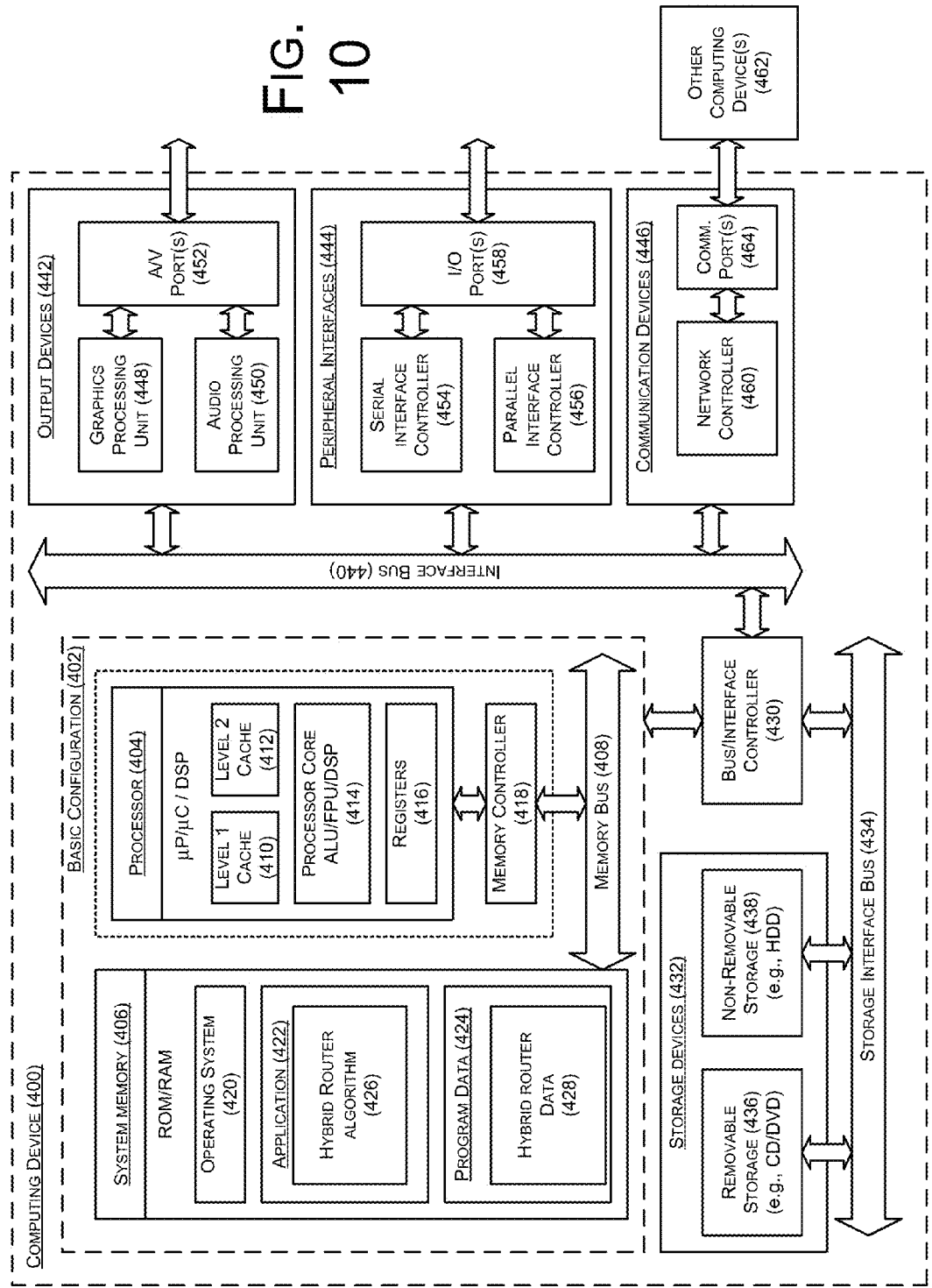

HYBRID ROUTERS IN MULTICORE ARCHITECTURES

CROSS REFERENCE TO RELATED APPLICATION

This application is a U.S. National Stage filing under 35 U.S.C. §371 of International Application No. PCT/US13/33115 filed Mar. 20, 2013. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

In multicore architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die. Each processor may be provided with a cache that stores data for the processor. Each processor may be provided with a router that may facilitate movement of data among processors and caches in the die.

SUMMARY

In some examples, multicore architectures are generally described. The multicore architectures may include a network, a first tile, and/or a second tile, configured to be in communication with the first tile through the network. In some examples, the first tile may include a processor core and a cache configured to be in communication with the processor core. In some examples, the first tile may include a router configured to be in communication with the cache. The router may be effective to move data with a packet switching channel or a circuit switching channel. The first tile may further include switching logic configured to be in communication with the cache and the router. The switching logic may be effective to receive a routing objective. The routing objective may relate to energy or delay costs in routing data through the network. The switching logic may be effective to select one of the packet switching channel or the circuit switching channel to move the data through the network based on the routing objective.

In some examples, methods for selecting a switching channel in a network of a multicore architecture are generally described. The methods may include receiving a program to be executed in the multicore architecture. The multicore architecture may include a first tile, and a second tile, configured to be in communication with the first tile through the network. The first tile may include a processor core. A cache may be configured to be in communication with the processor core and a router may be configured to be in communication with the cache. The router may be effective to move data with a packet switching channel or a circuit switching channel. The methods may include receiving a routing objective to execute the program by a switching logic in the first tile. The switching logic may be configured to be in communication with the cache and the router. The methods may include selecting, by the switching logic, one of the packet switching channel or the circuit switching channel to move the data through the network, based on the routing objective.

In some examples, systems are generally described. An example system may include a memory, a hardware controller, a network, a first tile, and/or a second tile. The memory may include an operating system. The operating system may be effective to send an instruction. The instruction may include a request to execute a program with a routing objective. The routing objective may relate to energy or delay costs in routing data through the network. The first tile may be configured to be in communication with the memory. The first tile may be effective to receive the instruction. The second tile may be configured to be in communication with the first tile through the network. The first tile may include a processor core, a cache configured to be in communication with the processor core, and a router configured to be in communication with the cache. The router may be effective to move data with a packet switching channel or a circuit switching channel. Switching logic may be configured to be in communication with the cache and the router. The switching logic may be effective to receive the routing objective. The switching logic may be effective to select one of the packet switching channel or the circuit switching channel to move the data through the network from the first tile to the second tile based on the routing objective.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 is a block diagram illustrating an example computing device that is arranged to implement hybrid routers in multicore architectures;

Figure 1:
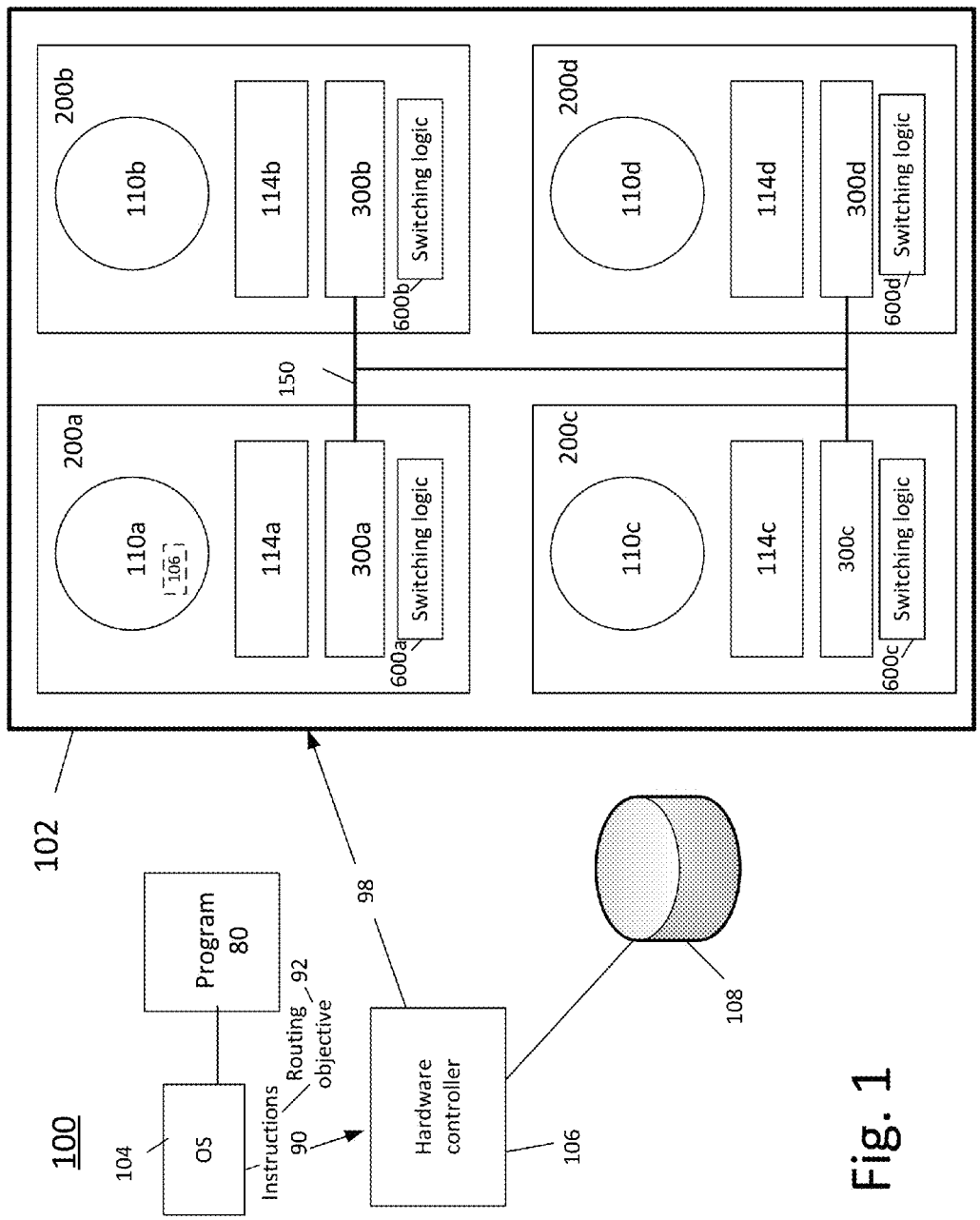
FIG. 1 illustrates an example system that can be utilized to implement hybrid routers in multicore architectures.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to methods, apparatus, systems, devices, and computer program products related to hybrid routers in multicore architectures.

Briefly stated technologies, technologies are generally described for methods and systems effective to implement hybrid routers in multicore architectures. A first tile may include a processor core, a cache configured to be in communication with the processor core and a router configured to be in communication with the cache. The router may be effective to move data with a packet switching channel or a circuit switching channel. The first tile may include switching logic configured to be in communication with the cache and the router. The switching logic may be effective to receive a routing objective that may relate to energy or delay costs in routing data through the network. The switching logic may select one of the packet switching channel or the circuit switching channel to move the data through the network based on the routing objective.

FIG. 1 illustrates an example system that can be utilized to implement hybrid routers in a multicore architectures arranged in accordance with at least some embodiments described herein. An example system 100 may include a die 102, a hardware controller 106, and/or a memory 108, all of which may be configured in communication with each other. Hardware controller 106, and/or memory 108 may be physically located inside or outside of die 102. Die 102 may include tiles 200 including tiles 200a, 200b, 200c, and/or 200d. Tiles 200 may include cores 110 (including cores 110a, 110b, 110c, 110d), caches 114 (including caches 114a, 114b, 114c and/or 114d) and/or routers 300 (including routers 300a, 300b, 300c, and/or 300d). Caches 114 may be, for example, L2 or L3 caches. Tiles 200 may further include switching logic 600 (including switching logic 600a, 600b, 600c, and/or 600d).

Tile 200a may include core 110a, cache 114a, router 300a and/or switching logic 600a. Tile 200b may include core 110b, cache 114b, router 300b and/or switching logic 600b. Tile 200c may include core 110c, cache 114c, router 300c and/or switching logic 600c. Tile 200d may include core 110d, cache 114d, router 300d and/or switching logic 600d.

Routers 300 may be configured in communication with network 150. As discussed in more detail below, network 150 and routers 300 may move data, data blocks, or code (hereinafter "data") using two or more switching techniques. Network 150 may include buses and related elements to effectuate movement of data. For example, network 150 and routers 300 may move data using a circuit switching channel or a packet switching channel.

Hardware controller 106 may receive, from operating system 104, instructions 90 to execute program 80 including a routing objective 92 associated with program 80. Routing objective 92 may relate to energy or delay costs in routing data through network 150. Delay costs may include, for example, time delay. Hardware controller 106 may be located off die 102 or on die 102 such as a piece of hardware logic that is associated with one or more cores. Hardware controller 106 may forward instructions 98 to an associated core in die 102. The associated core may then execute program 80 in light of routing objective 92. Switching logic 600 may select one of the switching channels based on routing objective 92. In an example, routing objective 92 may relate to energy or delay costs through network 150 such as: optimized performance (to minimize time delay), optimized energy usage (energy efficiency), and/or an optimized energy-delay product.

Figure 2:
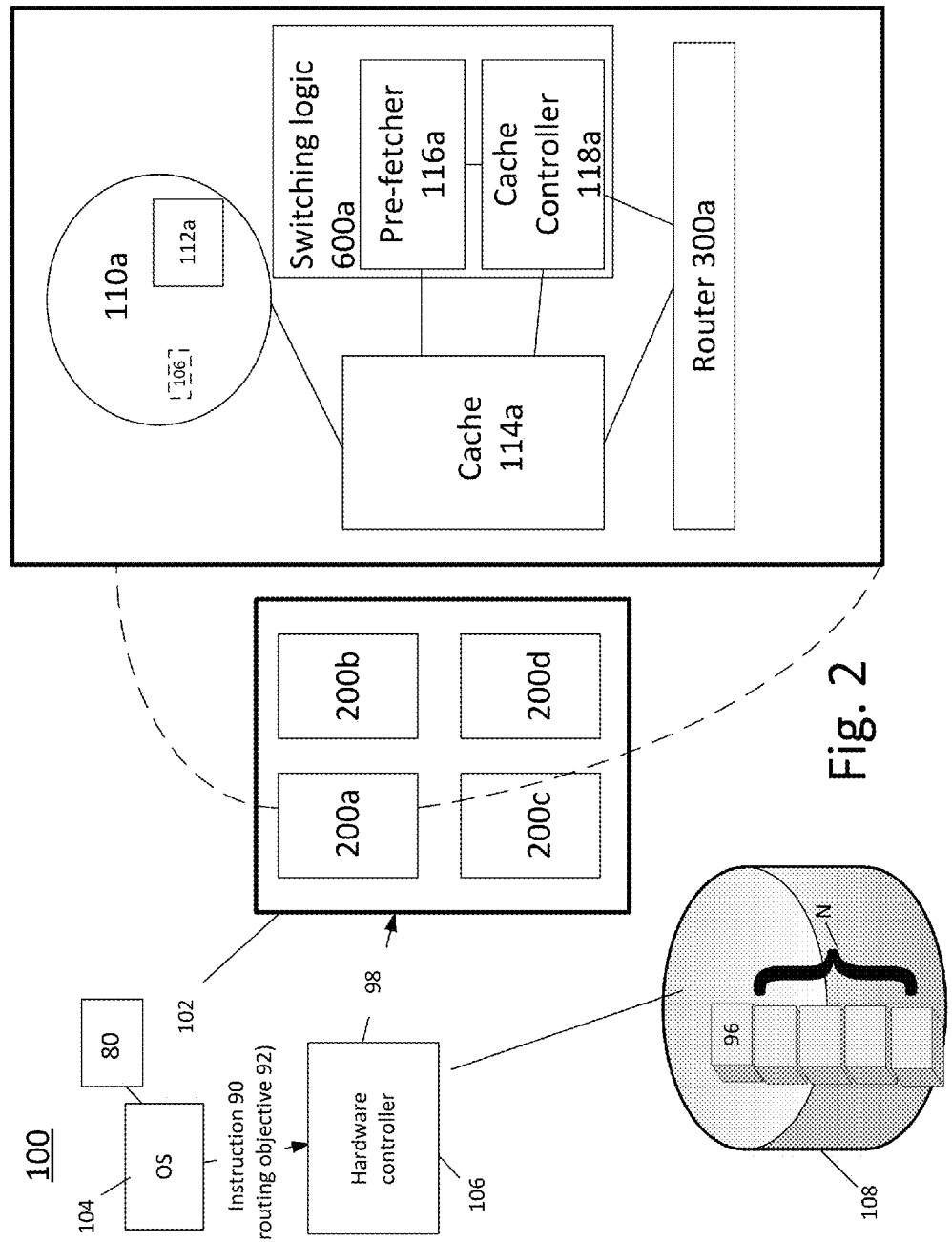
FIG. 2 illustrates the example system that can be utilized to implement hybrid routers in the multicore architecture of FIG. 1 showing more detail of an example tile including a pre-fetcher and cache controller.

FIG. 2 illustrates the example system that can be utilized to implement hybrid routers in a multicore architecture of FIG. 1 showing more detail of an example tile including a pre-fetcher and cache controller arranged in accordance with at least some embodiments described herein. FIG. 2 is similar to system 100 of FIG. 1, with additional details. Those components in FIG. 2 that are labeled identically to components of FIG. 1 will not be described again for the purposes of clarity.

Focusing on tile 200a as illustrative of tiles 200b, 200c and 200d, in addition to the components in FIG. 1, core 110a may include a cache 112a such as an L1 cache. Switching logic 600a may further include a pre-fetcher 116a and/or a cache controller 118a. Switching logic 600a may be configured in communication with router 300a and cache 114a. Pre-fetcher 116a may be configured to operate with cache controller 118a and/or router 300a to request data from memory 108. In some examples, pre-fetcher 116 may be configured to request multiple contiguous blocks of data from memory 108 when cache 114a experiences a cache miss.

In an example, a request for a data block 96 by core 110a may result in a cache miss in cache 114a when cache 114a does not store block 96. Pre-fetcher 116a may be configured to request data block X (not shown in FIG. 2), and an additional number N−1 of data blocks contiguous with X in memory 108. The number N of data blocks may be a fetching size of pre-fetcher 116a. As discussed in more detail below, additional number N−1 may be determined by switching logic 600a.

In an example, hardware controller 106 may forward instructions 98 to an associated core in die 102. The associated core may then execute program 80 in light of routing objective 92. After receiving instructions 98, core 110a may send a request for data block 96 to L1 cache 112a and/or L2 cache 114a. If both cache 112a and cache 114a experience a cache miss, cache controller 118a may request block 96 from memory 108 using a selecting switching channel. Switching logic 600a may select either a circuit switching channel or a packet switching channel based on routing objective 92. Switching logic 600a may also select a fetching size based on routing objective 92. Based on the switching channel and fetching size selected by switching logic 600a, cache controller 118a may communicate with router 300a to fetch block 96 and N additional data blocks from memory 108.

Figure 3:
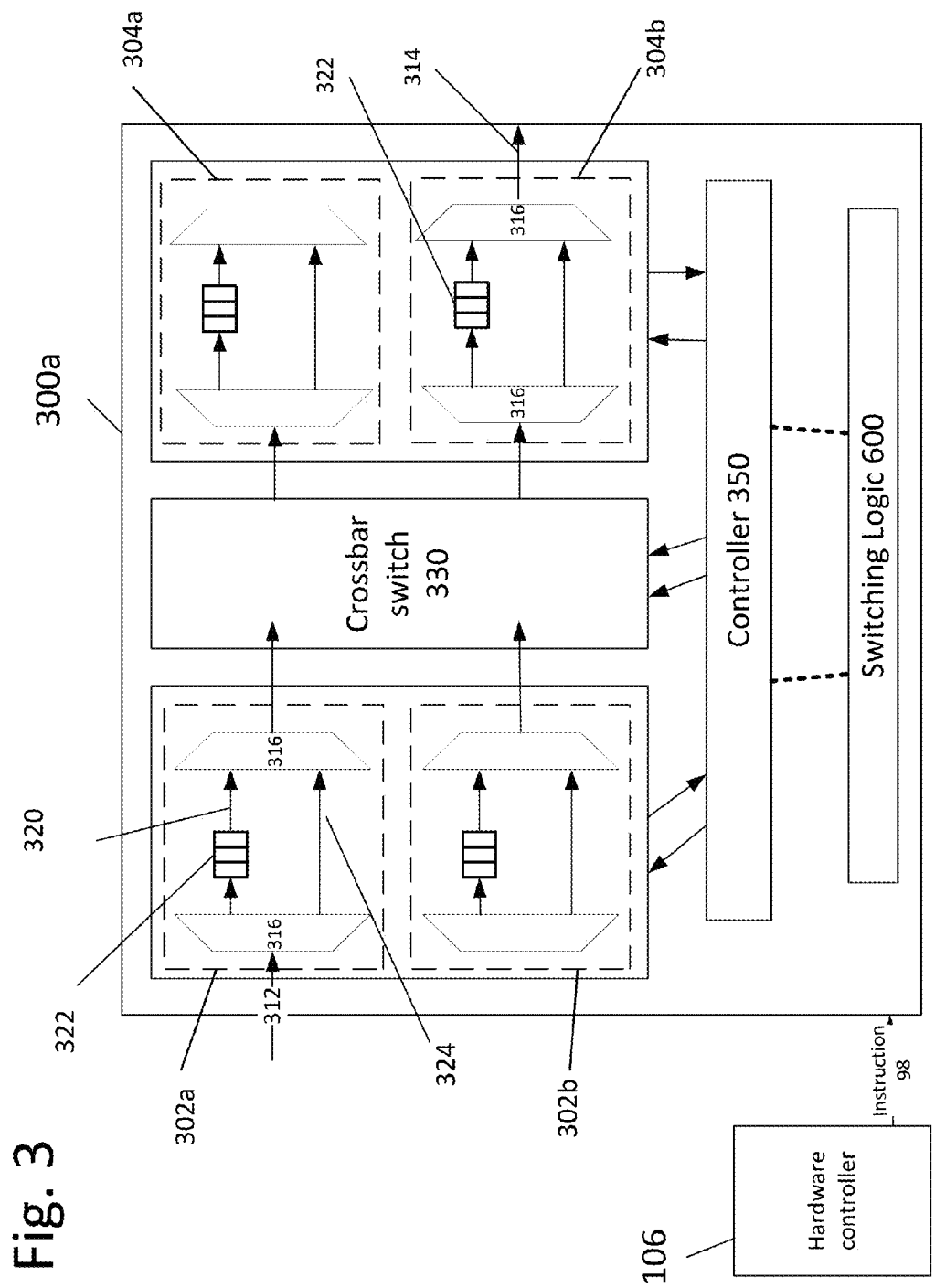
FIG. 3 is a system drawing showing additional detail of router 300*a* of FIG. 1.

FIG. 3 is a system drawing showing additional detail of the router 300a of FIG. 2 arranged in accordance with at least some embodiments described herein. Router 300a may include two or more input logic circuits 302 (including 302a and 302b) and two or more output logic circuits 304 (including 304a, and/or 304b). Input logic circuit 302a, may include an input port 312. Output logic circuit 304b may include an output port 314. Input logic circuits 302 and output logic circuits 304 may include multiplexer/demultiplexer 316 and a buffer 322. Buffer 322 may be configured to buffer and/or queue data blocks.

Router 300a may include a crossbar switch 330, a controller 350, and switching logic 600. Controller 350 may be configured in communication with output logic circuits 304 and/or switching logic 600. Controller 350 may be located within die 102 or outside die 102.

Input port 312 may provide a physical channel for data. Input port 312 may share two or more virtual channels: one or more packet switched channel 320 and/or one or more circuit switched channel 324. Controller 350, in conjunction with switching logic 600, may control a switching channel used by die 102 to move data in die 102. Examples of operations of routers 300 will be explained below.

Figure 4:
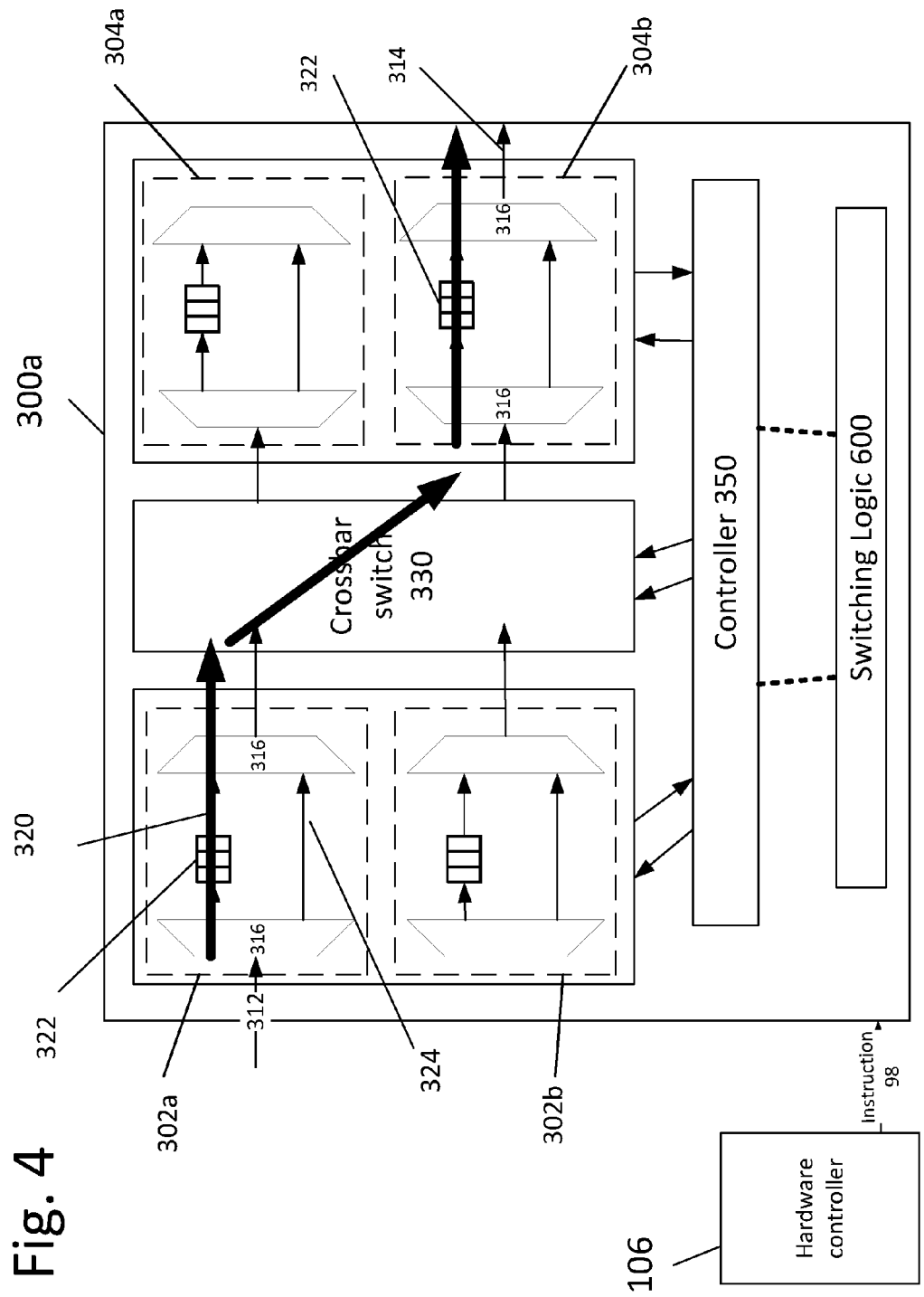
FIG. 4 is a system drawing illustrating an example packet switching operation of the router shown in FIG. 3.

FIG. 4 is a system drawing illustrating an example packet switching operation of the router shown in FIG. 3 arranged in accordance with at least some embodiments described herein. Those components in FIG. 4 that are labeled similarly to components of FIGS. 1, 2 and 3 will not be described again for the purposes of clarity.

In the example shown, a packet-switching channel may be used to move data from memory 108 to router 300a. In a packet switching channel, a message may be broken into packets and encapsulated in the packets. A short message may be encapsulated in a single packet. Packets may then be routed individually in flow control units or flits. If a packet does not fit into one flit, the packet may be broken into a head flit followed by body flits. For each packet of data to be moved, router 300a may perform four stages: 1) decode and route 2) allocate a virtual channel 3) allocate a switch and/or 4) traverse the switch. A packet may travel from the source router through multiple intermediate routers before arriving at the destination router.

In the first stage, the router may distinguish between a head and a body flit. The router may also decode a virtual channel identifier associated with packet switched channel 320 and buffer the flit in buffer 322. In the second stage, the router may request allocation for output of the data through the virtual channel. In the third stage, the router may request allocation for access to crossbar switch 330. And, in fourth stage, the flit may traverse the crossbar switch 330. The actual number of pipeline stages may depend on implementation, there may be fewer or more than four stages.

As the stages may be pipelined, four cycles may be used to process a head flit. Body flits may follow a head flit in different pipeline stages. Packet switching may be efficient from a latency perspective. But, as at each stage energy may be consumed, packet switching may be inefficient from an energy perspective. Relatively large buffers 322 may be used. At a router, the buffer may keep flits temporarily until virtual channel and switch allocation are performed. Some flits may also be kept until the router is sure that the router does not need to retransmit the flits. The large buffers may use significant power in a router.

Figure 5:
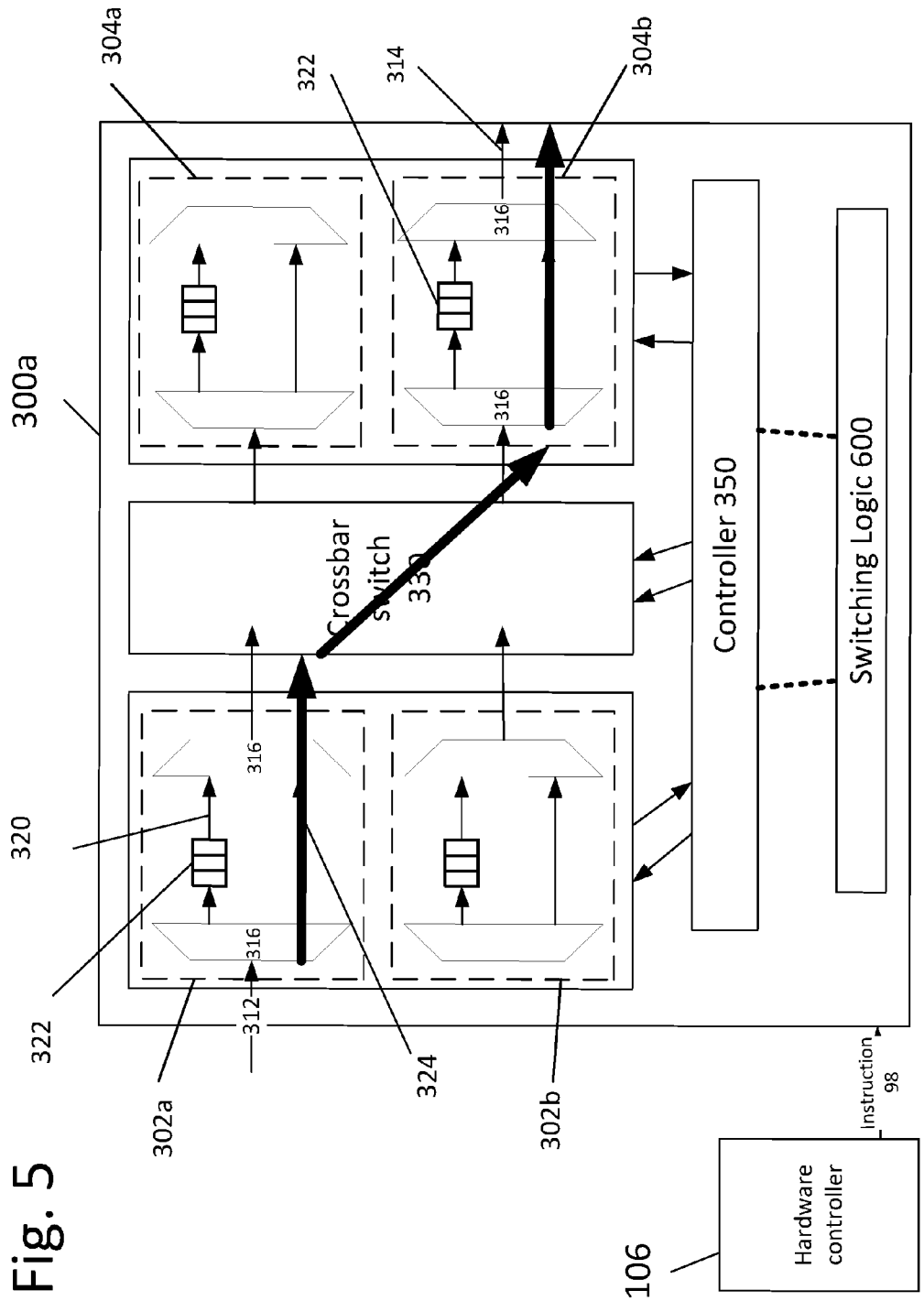
FIG. 5 is a system drawing illustrating an example circuit switching operation of the router shown in FIG. 3.

FIG. 5 is a system drawing illustrating an example circuit switching operation of the router shown in FIG. 3 arranged in accordance with at least some embodiments described herein. Those components in FIG. 5 that are labeled similarly to components of FIGS. 1, 2, 3 and 4 will not be described again for the purposes of clarity.

In the example shown, a circuit switching channel may be used to move data. In circuit switching, a circuit switched channel 324 may be reserved before data is moved. Connections and/or the path along circuit switched channel 324 may be defined and fixed during the duration of movement of the data. For example, controller 350 may define the connections and/or path. In another example, a source router may send a communication packet to a destination router. The communication packet may set up connections between the source and the destination routers. As connections between the source and destination are fixed, buffers may be eliminated resulting in a single stage pipeline. Circuit switching thus may yield an energy savings compared with packet switching. However, as connections are defined before packets are sent, circuit switching may have more latency than packet switching.

Figure 6:
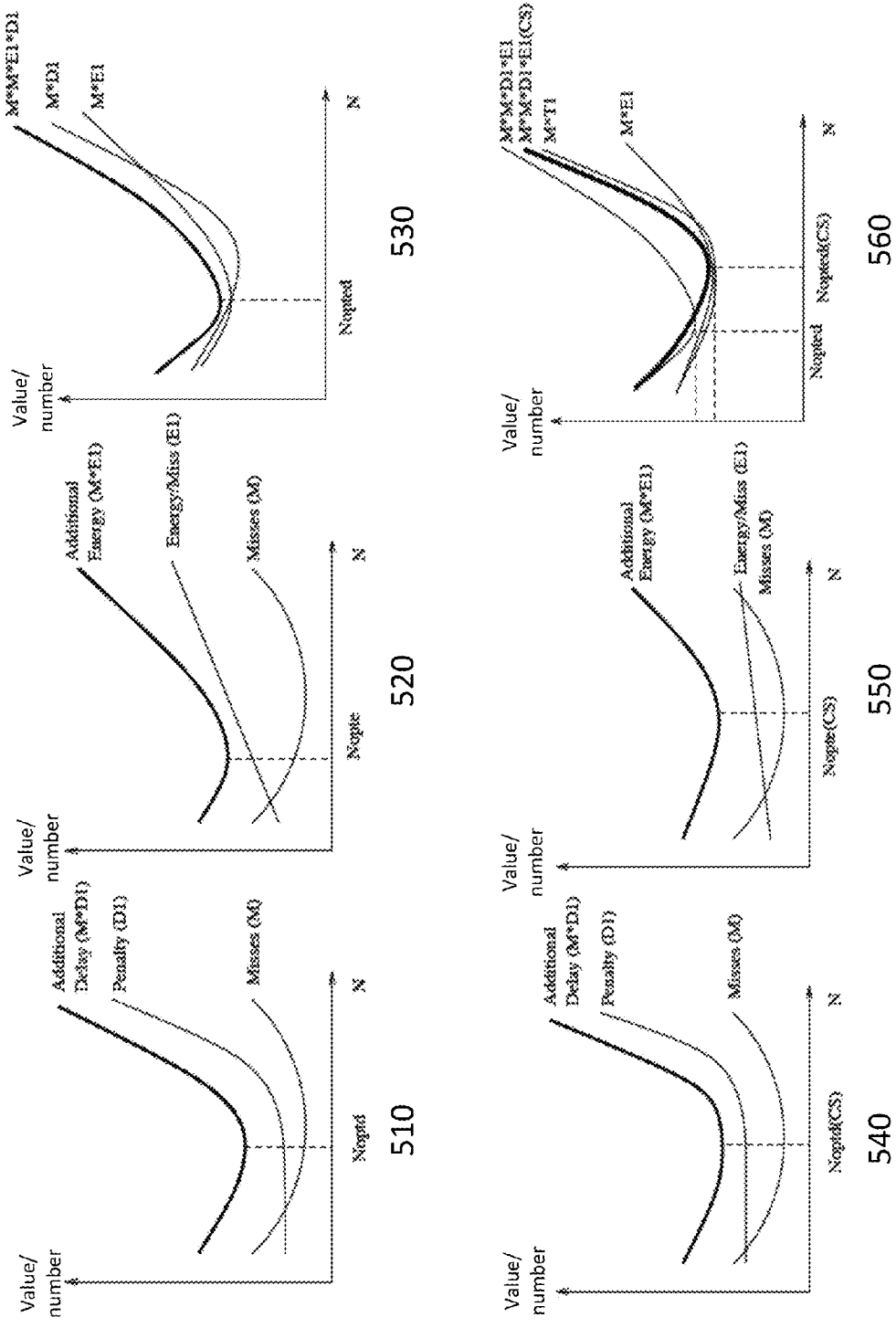
FIG. 6 illustrates graphs reflecting metrics that were analyzed using the system of FIG. 1.

FIG. 6 illustrates graphs reflecting metrics that were investigated using the system of FIG. 1 in accordance with at least some embodiments described herein. Graphs 510, 520, and/or 530 reflect metrics that were investigated while moving data using packet switching. Graphs 540, 550, and/or 560 reflect metrics that were investigated while moving data using circuit switching.

Within each graph, M denotes the number of cache misses, D1 denotes a delay penalty (the average addition to execution time for each cache miss), and E1 denotes the average additional energy for each cache miss. The total delay in program execution may then be denoted as the product of M and D1 (M*D1). The total additional energy required to execute the program may be denoted as the product of M and E1 (M*E1). N denotes a number of additional data blocks to be fetched by pre-fetcher 116 as described earlier. More specifically D=execution time of the program with no cache miss+M*D1;

E=energy to execute the program with no cache miss+M*E1;

To maximize performance, D should be minimized. To maximize energy efficiency, E should be minimized. If the application is to maximize energy but not at the expense of performance, E*D should be minimized.

Graphs 510 and 540 reflect the situation where an objective, such as routing objective 92, relates to optimized performance. Graph 510 shows results from a packet switching channel and graph 540 shows results from a circuit switching channel. An optimized value for N ("Noptd") may be chosen by locating the smallest value of M*D1. Graphs 520 and 550 reflect the situation where a routing objective relates to energy usage. Graph 520 shows results from packet switching and graph 550 shows results from circuit switching. Graphs 530 and 560 reflect the situation where a routing objective relates to an energy delay product. Graph 530 shows results from packet switching and graph 560 shows results from circuit-switching.

As shown in graph 510, as N increases, the number of misses (M) declines initially due to pre-fetching eliminating future cache misses. Thereafter, M increases as blocks which may not be accessed in the future are brought into the cache displacing more useful blocks. Penalty per cache miss D1 increases slowly initially but rapidly later on has high traffic induces queuing delay. M*D1 declines initially to reach an optimum N (Noptd) before increasing later. Graph 520 has a similar shape as graph 510. Graph 530, including M*M*E1*D1 has a similar shape as graphs 510 and 520 but at a more pronounced magnitude because of M2. In graphs

540, 550, 560, similar shaped graphs are shown as graphs 510, 520, 530 but with lower energy usage. However, there is a range of N where packet switching achieved a better energy-delay product.

Referring again to FIG. 2, in examples where fetching size N is fixed, switching logic 600*a* may select a switching channel based on routing objective 92. In this example, where N is fixed, an execution time of a program and an energy to execute the program with no cache misses should be the same for both channels. If performance optimization is selected as the routing objective, then packet switching may be used. If energy efficiency is to be optimized, a channel may be selected based on the size of N. If N is over a threshold number, as routes use only one pipeline stage, circuit switching may use less energy. Below the threshold, packet switching may be used. If the energy-delay product is selected as the routing objective, for N over a threshold, circuit switching may be used. If N is below the threshold, packet switching may be used.

Figure 7:
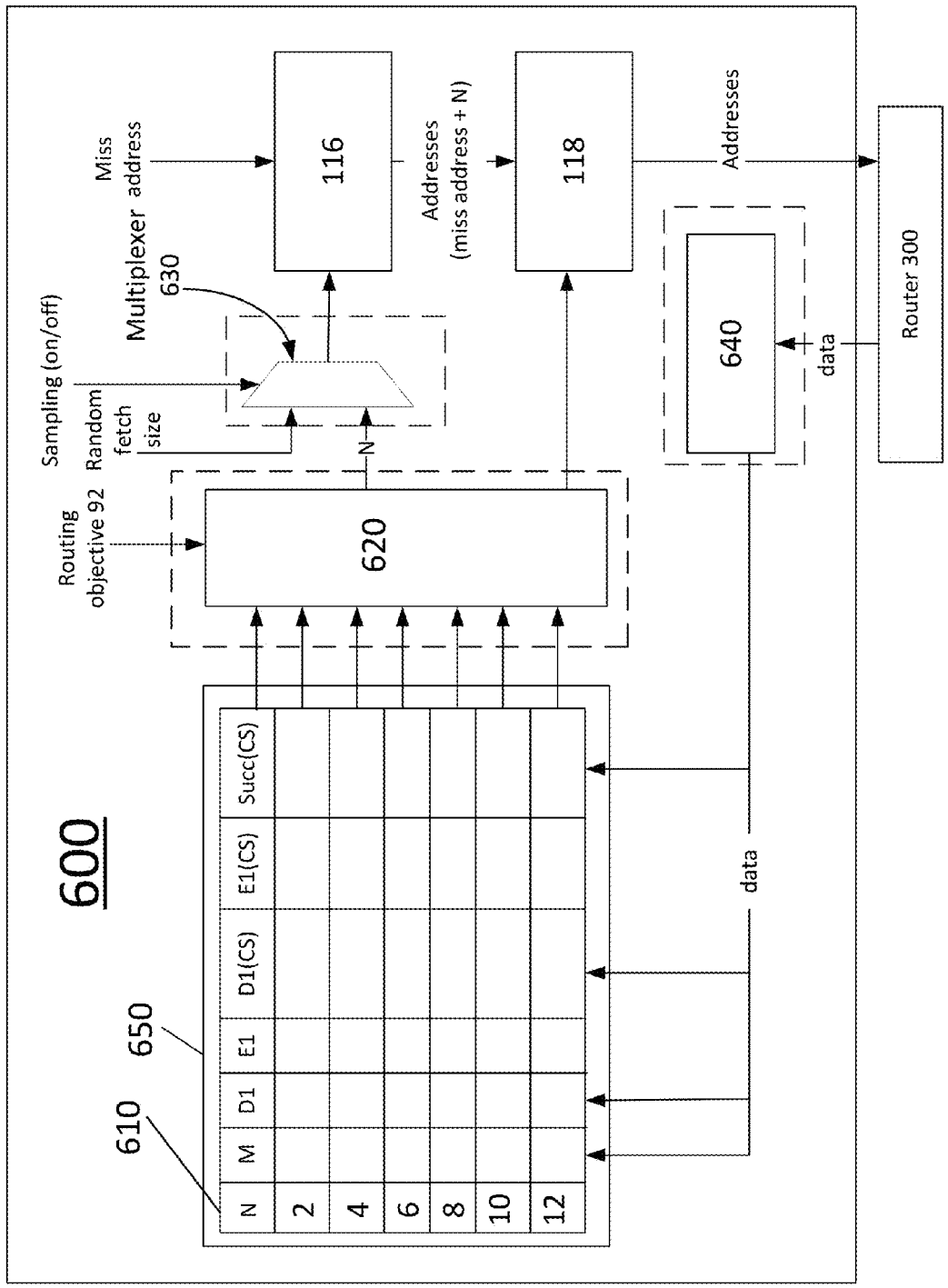
FIG. 7 is block diagram illustrating an example switching logic in the system of FIG. 1.

FIG. 7 is block diagram illustrating an example switching logic in the system of FIG. 1 in accordance with at least some embodiments described herein. Switching logic 600 may be used to select a switching channel and/or to select a pre-fetching value of N.

Switching logic 600 may include a memory 650, selection logic 620, a multiplexer 630, pre-fetcher 116, cache controller 118, and/or collection logic 640. Memory 650 may include a table 610 including fields with previously discussed variables N, M, D1, E1, D1(CS), E1(CS), and/or Succ(CS). In table 610, (CS) may denote a circuit-switching channel and an absence of a parenthetical may denote a packet switching channel. Memory 650 may be configured in communication with selection logic 620 as explained in more detail below. Selection logic 620 may be configured to receive routing objective 92 and inputs from table 610 and may output a fetch size N to multiplexer 630. Multiplexer 630 may receive a sampling input (on/off), a random fetch size that may be used to initially calibrate table 610, and an output from selection logic 620. Pre-fetcher 116 may receive a miss address and an output from multiplexer 630 and may output addresses to cache controller 118. Cache controller 118 may output addresses to fetch data to router 300. As data is received, collection logic 640 may receive the data and populate table 610 in memory 650.

Field N may store values of a fetching size to be considered. Fields M, D1, E1, D1(CS), E1 (CS), and/or Succ(CS) may be populated for each value of N as data is received by collection logic 640. Fields M, D1, E1, D1(CS), and/or E1(CS) denote the same variables as mentioned above with respect to FIG. 5. Fields M, D1, E1, D1(CS), and/or E1(CS) may be computed as an average of recent historical data collected periodically or as needed. Field Succ(CS) may include recent historical data relating to the success rate of moving N contiguous blocks from a source to a destination using a circuit switch channel. Sending N blocks of data using a circuit switch channel may involve reserving channels along the path to be reserved ahead of the transfer, and such a reservation request may not always be successful. A reservation may not succeed (as indicated by the success rate "Succ(CS)") when there are already other circuit switch paths reserved that collide with this reservation. The success rate may be used to adjust metrics relating to the selection of the circuit switching channel so that channel switching is not selected if the optimum fetch rate cannot be successfully achieved with a desired success percentage rate.

To determine a value of N, switching logic 600 may evaluate different values of N, measure metrics in table 610, and identify which fetch size provides the best results for the metric identified in routing objective 92. For example, for a defined number of data moves in a sampling period, a random fetch size may be input into multiplexer 630 and the sampling input may be set to "on". The defined number may be a fraction of the number of available different fetch sizes. Data received by collection logic 640, in response to the random fetch size, may then be used to populate table 610. When the defined number of moves is complete, the sampling period is complete and a selection may be made regarding a switching channel to be used. In some examples, the prefetcher may not have a tunable fetch size, but has a tunable prefetch aggressiveness. In such examples, the value of N may be used to guide the aggressiveness level of the prefetcher.

Reference will now be made to FIGS. 2 and 7. In an example, a cache miss for block X may be experienced in cache 114*a* in tile 200*a*. Processor 110*a* may inform switching logic 600*a* of the cache miss. In response to a cache miss for block X, switching logic 600*a* may select N data blocks to be pre-fetched, including block X. Switching logic 600*a* may also select a switching channel to move the data blocks. When switching logic 600 begins execution, a content of table 610 may be forwarded to selection logic 620. Selection logic 620 may use the contents from table 610 to calculate various metrics in light of routing objective 92. Upon completion of calculation of various metrics, based on the routing objective 92, selection logic 620 may determine an optimized value of N. Selection logic 620 may also select one of the packet switching channel or the circuit switching channel. Selection logic 620 may base the determination of the optimized value of N, and the selection of the channel, based on the routing objective, a packet switched delay, a circuit switched delay, a packet switched energy cost and a circuit switched energy cost.

Selection logic 620 may send the determined value of N to multiplexer 630 and/or send a selected switching channel to cache controller 118. If sampling mode is "off", the value of N determined by selection logic 620 may be sent to pre-fetcher 116. If the sampling mode is "on", multiplexer 630 may output the random fetch size to pre-fetcher 116. Pre-fetcher 116 may receive a value of N (either the output from selection logic 620 or the random fetch size), and the miss address. The miss address may identify an address in memory 108 or in a cache where the pre-fetcher may send the request for the missed blocks of data. Pre-fetcher 116 then may generate the addresses (the miss address plus N blocks) to request data from memory 108.

Pre-fetcher 116 may send the addresses to cache controller 118. Cache controller 118 may communicate with router 300 to fetch the missing data blocks from memory 108 using the selected switching channel. Cache controller 118 may fetch data at the addresses either separately per block (as in packet switching) or as a single request (as in circuit switching).

When the requested data blocks return to router 300, collection logic 640 may receive the blocks and calculate values in table 610. For example, collection logic 640 may keep track of a time between when a request for a data block is sent and when the data block is received. If circuit switch reservation fails and data is sent using packet switch channel instead, the success field (Succ) may be updated accordingly to indicate a success rate for circuit switch reservation. Collection logic 640 may then store and/or update values in table 610.

When the sampling mode is "on", random values of N may be sent to multiplexer 630 and be selected for processing. Switching logic 600 may perform multiple cycles of sampling, each using a different value of N, before making a decision for a value of N. Contents in table 610 may be updated after each cycle of sampling.

In another example, cache controller 118 may reserve a circuit switching channel for N blocks. If switching logic 600 determines that the path cannot be reserved because resources are being used by another circuit switching connection, switching logic 600 may switch to a packet switching channel.

Among other possible benefits, a system in accordance with the disclosure may be able to reduce the energy consumed by a router in a multicore architecture. Routers may consume significant portions of power in a die. Programmers may select whether routers route data in a die to optimize performance, energy efficiency, or a product of performance and energy. A routing objective may be chosen based on an application. For example, if a priority is in preserving battery life, an energy efficiency objective may be chosen. If time is a priority, a performance routing objective may be chosen. An operating system or application may control how routers move data and thereby control latency efficiency or a delay efficiency. A network on a chip may be able to select between a packet switching channel and circuit switching channel. Circuit switching may be used more often for large fetch values because the cost in setting up the circuit may be amortized when the network transfers large numbers of blocks.

Figure 8:
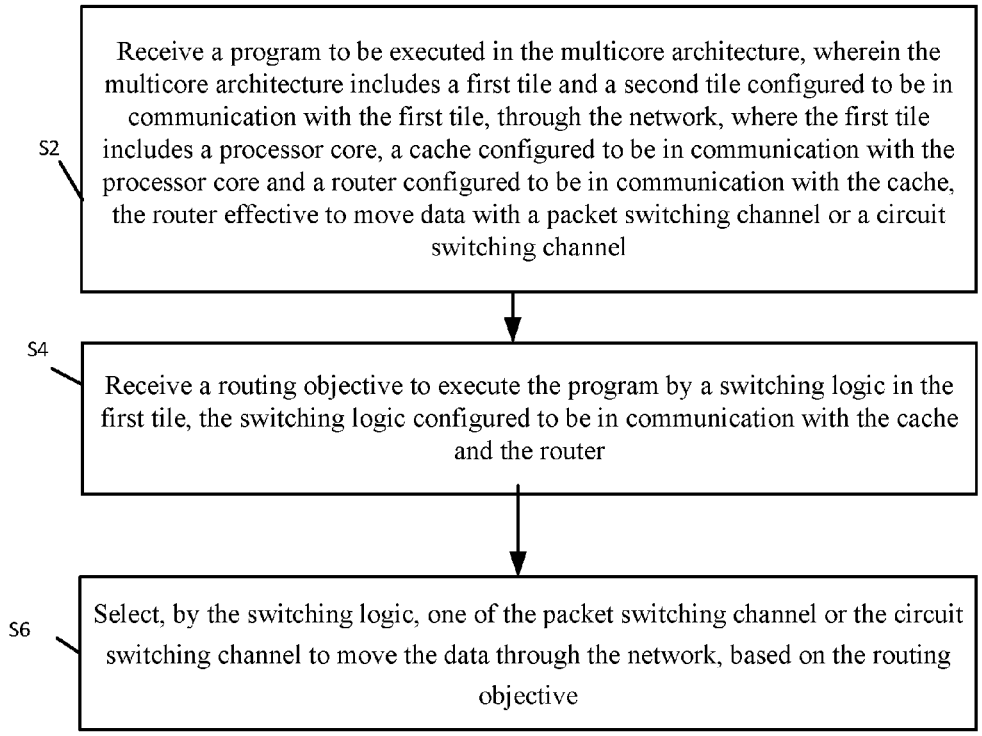
FIG. 8 depicts a flow diagram for an example process for implementing hybrid routers in multicore architectures.

FIG. 8 depicts a flow diagram for an example process for implementing hybrid routers in multicore architectures arranged in accordance with at least some embodiments described herein. In some examples, the process in FIG. 8 could be implemented using system 100 discussed above to selecting a switching channel in a network of a multicore architecture.

An example process may include one or more operations, actions, or functions as illustrated by one or more of blocks S2, S4 and/or S6. Although illustrated as discrete blocks, various blocks may be divided into additional blocks, combined into fewer blocks, or eliminated, depending on the desired implementation.

Processing may begin at block S2, "Receive a program to be executed in the multicore architecture, wherein the multicore architecture includes a first tile and a second tile, configured to be in communication with the first tile, through the network, where the first tile includes a processor core, a cache configured to be in communication with the processor core and a router configured to be in communication with the cache, the router effective to move data with a packet switching channel or a circuit switching channel." At block S2, a program may be received in a multicore architecture. The architecture may include first and second tiles. The first tile may include a processor core, a cache, and a router.

Processing may continue from block S2 to block S4, "Receive a routing objective to execute the program by a switching logic in the first tile, the switching logic configured to be in communication with the cache and the router." At block S4, the switching logic may receive a routing objective to execute the program. A fetching size may be determined for a pre-fetcher based on the routing objective.

Processing may also continue from block S4 to block S6, "Select, by the switching logic, one of the packet switching channel or the circuit switching channel to move the data through the network, based on the routing objective." At block S6, the switching logic may select one of a packet switching channel or a circuit switching channel to move the data through the network based on the routing objective. The switching logic may determine packet switched energy, packet switched delay, circuit switched energy, and circuit switched delay. The switching logic may further select the packet switching channel or circuit switched channel based on the determined energies and delays.

The switching logic may further determine a fetching size number (in examples where the fetching size is dynamic) of blocks for a pre-fetcher based on the determined energies and delays. The switching logic may determine a success rate to fetch the fetching size number of blocks and select the number of blocks based on the success rate. For example, the success rate may be multiplied by the latency, energy, or energy delay product to estimate the latency, energy, and energy delay characteristics of circuit switching of a particular fetch size. In response to a cache miss for a block, a cache controller may send a request through the network for the block using the selected channel.

Figure 9:
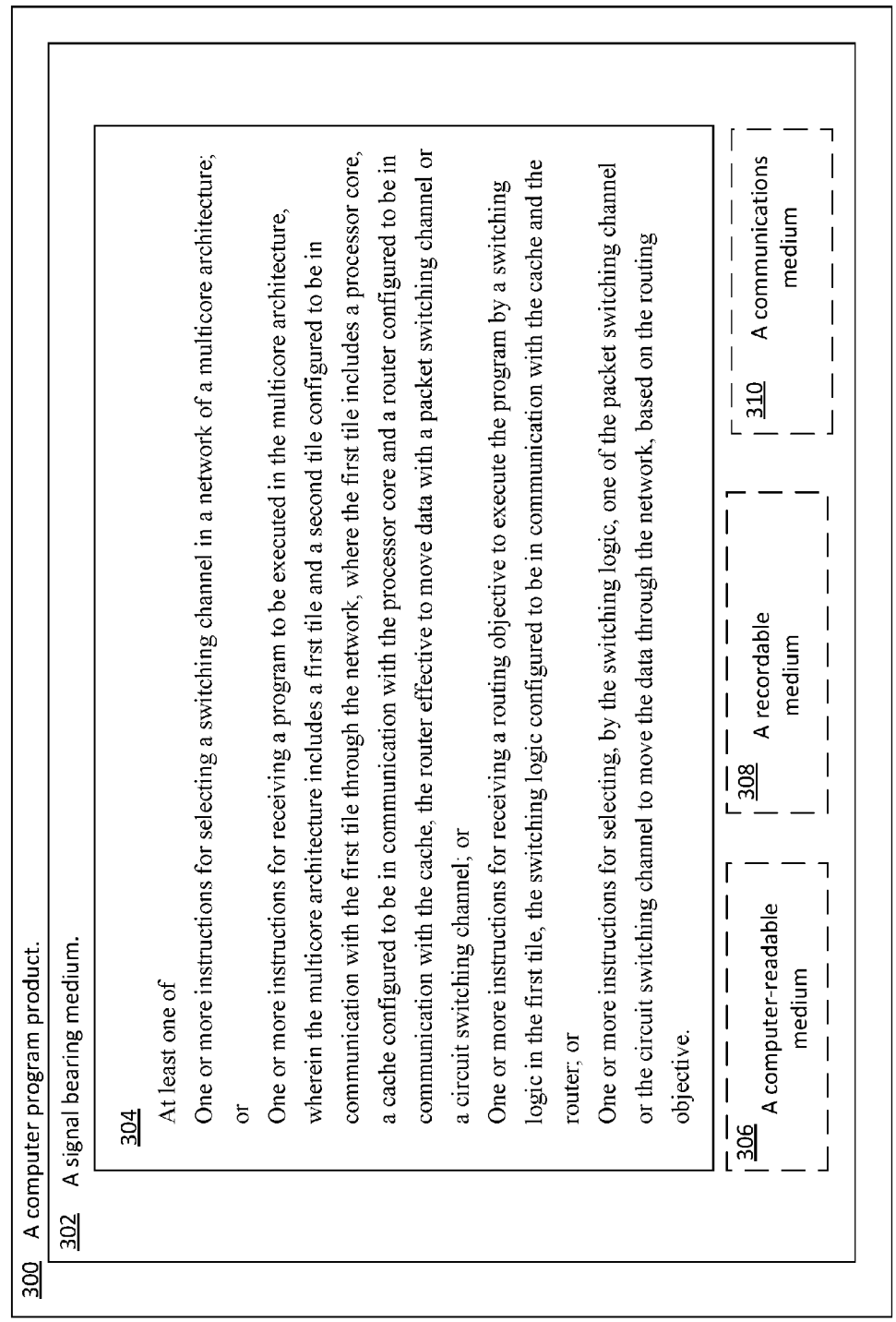
FIG. 9 illustrates a computer program product that can be utilized to implement hybrid routers in multicore architectures.

FIG. 9 illustrates an example computer program product 300 that can be utilized to implement hybrid routers in multicore architectures arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-8. Thus, for example, referring to system 100, processor 110*a* in tile 200*a* may undertake one or more of the blocks shown in FIG. 9 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 10 is a block diagram illustrating an example computing device 400 that is arranged to implement hybrid routers in multicore architectures arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a hybrid router algorithm 426 that is arranged to perform the functions as described herein including those described with respect to system 100 of FIGS. 1-9. Program data 424 may include hybrid router data 428 that may be useful to implement hybrid routers in multicore architectures as is described herein. In some embodiments, application 422 may be arranged to operate with program data 424 on operating system 420 such that hybrid routers in multicore architectures may be provided. This described basic configuration 402 is illustrated in FIG. 9 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A multicore processor, comprising:
a first tile;
a second tile configured to be in communication with the first tile through a network within the multicore processor;
wherein the first tile includes:
    a processor core configured to receive an instruction to execute a program that includes a routing objective;
    a cache configured to be in communication with the processor core;
    a router configured to be in communication with the cache, the router effective to move data with a packet switched channel or a circuit switched channel; and
    switch logic configured to be in communication with the cache and the router, wherein the switch logic is effective to:
        receive the routing objective, wherein the routing objective relates to energy or delay costs to route data associated with the program through the network within the multicore processor; and
        prior to movement of data associated with the program, select one of the packet switched channel or the circuit switched channel to move the data associated with the program through the network based on the routing objective.

2. The multicore processor of claim 1, wherein the switch logic is effective to:
    determine a packet switched energy, the packet switched energy being an energy to move data through the network using the packet switched channel;
    determine a circuit switched energy, the circuit switched energy being an energy to move data through the network using the circuit switched channel;
    determine a packet switched delay, the packet switched delay being a delay to move data through the network using the packet switched channel;
    determine a circuit switched delay, the circuit switched delay being a delay to move data through the network using the circuit switched channel; and
    select one of the packet switched channel or the circuit switched channel based on the packet switched energy, the circuit switched energy, the packet switched delay, and/or the circuit switched delay.

3. The multicore processor of claim 1, wherein:
the first tile includes a pre-fetcher configured to be in communication with the cache and the router; and
the switch logic is further configured to determine a fetch size for the pre-fetcher based on the routing objective.

4. The multicore processor of claim 1, wherein:
the first tile includes a pre-fetcher; and
the switch logic is effective to:
    determine a packet switched energy, the packet switched energy being an energy to move data through the network using the packet switched channel;
    determine a circuit switched energy, the circuit switched energy being an energy to move data through the network using the packet switched channel;
    determine a packet switched delay, the packet switched delay being a delay to move data through the network using the packet switched channel;
    determine a circuit switched delay, the circuit switched delay being a delay to move data through the network using the packet switched channel;

select one of the packet switched channel or the circuit switched channel based on the packet switched energy, the circuit switched energy, the packet switched delay, and/or the circuit switched delay; and determine a fetch size number of blocks for the pre-fetcher based on the routing objective, the packet switched energy, the circuit switched energy, the packet switched delay and the circuit switched delay.

5. The multicore processor of claim 1, wherein in response to a cache miss by the cache for a particular block, a cache controller is effective to generate a request for the particular block through the selected one of the packet switched channel or the circuit switched channel.

6. The multicore processor of claim 1, wherein:
the first tile includes a pre-fetcher;
the switch logic is effective to:
   determine a packet switched energy, the packet switched energy being an energy to move data through the network using the packet switched channel;
   determine a circuit switched energy, the circuit switched energy being an energy to move data through the network using the packet switched channel;
   determine a packet switched delay, the packet switched delay being a delay to move data through the network using the packet switched channel;
   determine a circuit switched delay, the circuit switched delay being a delay to move data through the network using the packet switched channel;
   determine a fetch size number of blocks based on the routing objective, the packet switched energy, the circuit switched energy, the packet switched delay and the circuit switched delay;
   determine a success rate to fetch the fetch size number of blocks; and
   select one of the packet switched channel or the circuit switched channel based on the packet switched energy, the circuit switched energy, the packet switched delay, the circuit switched delay, and/or the success rate.

7. The multicore processor of claim 1, wherein the switch logic is effective to select one of the packet switched channel or the circuit switched channel by:
identification of two or more randomly selected fetch sizes;
identification of a randomly selected channel;
determination of measured delays for the randomly selected channel for the randomly selected fetch sizes;
determination of measured energies for the randomly selected channel for the randomly selected fetch sizes; and
selection of one of the packet switched channel or the circuit switched channel based on the measured delays and energies.

8. A method to select a switched channel in a network of a multicore processor, the method comprising:
receiving an instruction to execute a program in the multicore processor, wherein the program includes a routing objective, the multicore processor includes a first tile and a second tile configured to be in communication with the first tile through the network of the multicore processor, wherein the first tile includes a processor core, a cache configured to be in communication with the processor core, and a router configured to be in communication with the cache, wherein the router is effective to move data with a packet switched channel or a circuit switched channel, and wherein the routing objective relates to energy or delay costs to route data associated with the program through the network of the multicore processor;

receiving, by switch logic in the first tile, the routing objective, the switch logic configured to be in communication with the cache and the router; and prior to movement of data associated with the program, selecting, by the switch logic, one of the packet switched channel or the circuit switched channel to move the data associated with the program through the network, based on the routing objective.

9. The method of claim 8, further comprising, by the switch logic:
determining a packet switched energy, the packet switched energy being an energy to move data through the network using the packet switched channel;
determining a circuit switched energy, the circuit switched energy being an energy to move data through the network using the circuit switched channel;
determining a packet switched delay, the packet switched delay being a delay to move data through the network using the packet switched channel; and
determining a circuit switched delay, the circuit switched delay being a delay to move data through the network using the circuit switched channel; and
wherein selecting one of the packet switched channel or the circuit switched channel includes selecting one of the packet switched channel or the circuit switched channel based on the packet switched energy, the circuit switched energy, the packet switched delay, and/or the circuit switched delay.

10. The method of claim 8, further comprising determining a fetch size for a pre-fetcher based on the routing objective.

11. The method of claim 8, further comprising, by the switch logic:
determining a packet switched energy, the packet switched energy being an energy to move data through the network using the packet switched channel;
determining a circuit switched energy, the circuit switched energy being an energy to move data through the network using the packet switched channel;
determining a packet switched delay, the packet switched delay being a delay to move data through the network using the packet switched channel;
determining a circuit switched delay, the circuit switched delay being a delay to move data through the network using the packet switched channel;
wherein selecting one of the packet switched channel or the circuit switched channel includes selecting one of the packet switched channel or the circuit switched channel based on the packet switched energy, the circuit switched energy, the packet switched delay, and/or the circuit switched delay; and
determining a fetch size number of blocks for the pre-fetcher based on the routing objective, the packet switched energy, the circuit switched energy, the packet switched delay and the circuit switched delay.

12. The method of claim 8, further comprising:
detecting a cache miss by the cache for a particular block; and
sending a request by a cache controller for the particular block through the selected one of the packet switched channel or the circuit switched channel.

13. The method of claim 8, further comprising, by the switch logic:

determining a packet switched energy, the packet switched energy being an energy to move data through the network using the packet switched channel;

determining a circuit switched energy, the circuit switched energy being an energy to move data through the network using the packet switched channel;

determining a packet switched delay, the packet switched delay being a delay to move data through the network using the packet switched channel;

determining a circuit switched delay, the circuit switched delay being a delay to move data through the network using the packet switched channel;

determining a fetch size number of blocks based on the routing objective, the packet switched energy, the circuit switched energy, the packet switched delay and the circuit switched delay; and determining a success rate to fetch the fetch size number of blocks; and wherein selecting one of the packet switched channel or the circuit switched channel includes selecting one of the packet switched channel or the circuit switched channel based on the packet switched energy, the circuit switched energy, the packet switched delay, the circuit switched delay, and/or the success rate.

14. The method of claim 8, wherein selecting by the switch logic comprises:

identifying two or more randomly selected fetch sizes;
  identifying a randomly selected channel;
  determining measured delays for the randomly selected channel for the randomly selected fetch sizes;
  determining measured energies for the randomly selected channel for the randomly selected fetch sizes; and
  selecting one of the packet switched channel or the circuit switched channel based on the measured delays and energies.

15. A multicore processor system, comprising:

a first tile; and
  a second tile configured to be in communication with the first tile through a network in the multicore processor system;
  wherein the first tile includes:
    a processor core;
    a cache configured to be in communication with the processor core;
    a router configured to be in communication with the cache, the router effective to move data with a packet switched channel or a circuit switched channel; and
    switch logic configured to be in communication with the cache and the router, wherein the switch logic is effective to:
      receive a routing objective that pertains to execution of a program, wherein the routing objective relates to energy or delay costs to route data associated with the program through the network in the multicore processor system; and
      prior to movement of data associated with the program, select one of the packet switched channel or the circuit switched channel to move the data associated with the program through the network based on the routing objective.

16. The multicore processor system of claim 15, wherein the switch logic is effective to:

determine a packet switched energy, the packet switched energy being an energy to move data through the network using the packet switched channel;

determine a circuit switched energy, the circuit switched energy being an energy to move data through the network using the circuit switched channel;

determine a packet switched delay, the packet switched delay being a delay to move data through the network using the packet switched channel; and determine a circuit switched delay, the circuit switched delay being a delay to move data through the network using the circuit switched channel; and wherein to select one of the packet switched channel or the circuit switched channel based on the routing objective, the switch logic is effective to select one of the packet switched channel or the circuit switched channel based on the packet switched energy, the circuit switched energy, the packet switched delay, and/or the circuit switched delay.

17. The multicore processor system of claim 15, wherein:

the first tile includes a pre-fetcher; and
the switch logic is effective to:

determine a packet switched energy, the packet switched energy being an energy to move data through the network using the packet switched channel;

determine a circuit switched energy, the circuit switched energy being an energy to move data through the network using the packet switched channel;

determine a packet switched delay, the packet switched delay being a delay to move data through the network using the packet switched channel;

determine a circuit switched delay, the circuit switched delay being a delay to move data through the network using the packet switched channel;

wherein to select one of the packet switched channel or the circuit switched channel based on the routing objective, the switch logic is effective to select one of the packet switched channel or the circuit switched channel based on the packet switched energy, the circuit switched energy, the packet switched delay, and/or the circuit switched delay; and determine a fetch size number of blocks for the pre-fetcher based on the routing objective, the packet switched energy, the circuit switched energy, the packet switched delay and the circuit switched delay.

18. The multicore processor system of claim 15, wherein the switch logic includes a cache controller, and in response to a cache miss by the cache for a particular block, the cache controller is effective to generate a request for the particular block through the selected one of the packet switched channel or the circuit switched channel.

19. The multicore processor system of claim 15, wherein:

the first tile includes a pre-fetcher;
the switch logic is effective to:

determine a packet switched energy, the packet switched energy being an energy to move data through the network using the packet switched channel;

determine a circuit switched energy, the circuit switched energy being an energy to move data through the network using the packet switched channel;

determine a packet switched delay, the packet switched delay being a delay to move data through the network using the packet switched channel;

determine a circuit switched delay, the circuit switched delay being a delay to move data through the network using the packet switched channel;

determine a fetch size number of blocks based on the routing objective, the packet switched energy, the circuit switched energy, the packet switched delay and the circuit switched delay; and determine a success rate to fetch the fetch size number of blocks; and wherein to select one of the packet switched channel or the circuit switched channel based on the routing objective, the switch logic is effective to select one of the packet switched channel or the circuit switched channel based on the packet switched energy, the circuit switched energy, the packet switched delay, the circuit switched delay, and/or the success rate.

20. The multicore processor system of claim 15, wherein the switch logic is effective to select one of the packet switched channel or the circuit switched channel by:

identification of two or more randomly selected fetch sizes;

identification of a randomly selected channel;

determination of measured delays for the randomly selected channel for the randomly selected fetch sizes;

determination of measured energies for the randomly selected channel for the randomly selected fetch sizes; and selection of one of the packet switched channel or the circuit switched channel based on the measured delays and energies.

* * * * *